United States Patent [19]
Ehrlich

[11] 3,744,569
[45] July 10, 1973

[54] TILLER ATTACHMENT FOR POWER MOWERS

[76] Inventor: Benjamin Ehrlich, 3200 Meadowlark Lane, Great Bend, Kans. 67530

[22] Filed: Dec. 13, 1971

[21] Appl. No.: 207,489

[52] U.S. Cl.................... 172/42, 172/125, 172/247
[51] Int. Cl.............................................. A01b 33/00
[58] Field of Search...................... 56/2, 16.9, 256; 74/16; 172/42, 123, 125, 247

[56] References Cited
UNITED STATES PATENTS

| | | | |
|---|---|---|---|
| 3,455,398 | 7/1969 | Bowers | 172/247 X |
| 2,975,839 | 3/1961 | Burrows et al. | 172/42 X |
| 2,792,770 | 5/1957 | Ober | 172/68 |
| 2,864,293 | 12/1958 | Edrich et al. | 172/42 |
| 3,040,590 | 6/1962 | Smithburn | 172/42 X |

*Primary Examiner*—Robert E. Pulfrey
*Assistant Examiner*—R. T. Hader
*Attorney*—Harvey B. Jacobson

[57] ABSTRACT

A tiller assembly for attachment to power mowers or the like, said assembly comprising a support framework adapted to be conveniently connected to a power mower housing, a drive shaft rotatably carried by the framework and operatively connected to a plurality of tiller tines for rotation thereof, and a drive belt connecting the power mower output shaft with the drive shaft and being provided with means for selectively adjusting the belt tension during operation of the assembly.

6 Claims, 5 Drawing Figures

Fig. 3
Fig. 4
Fig. 5
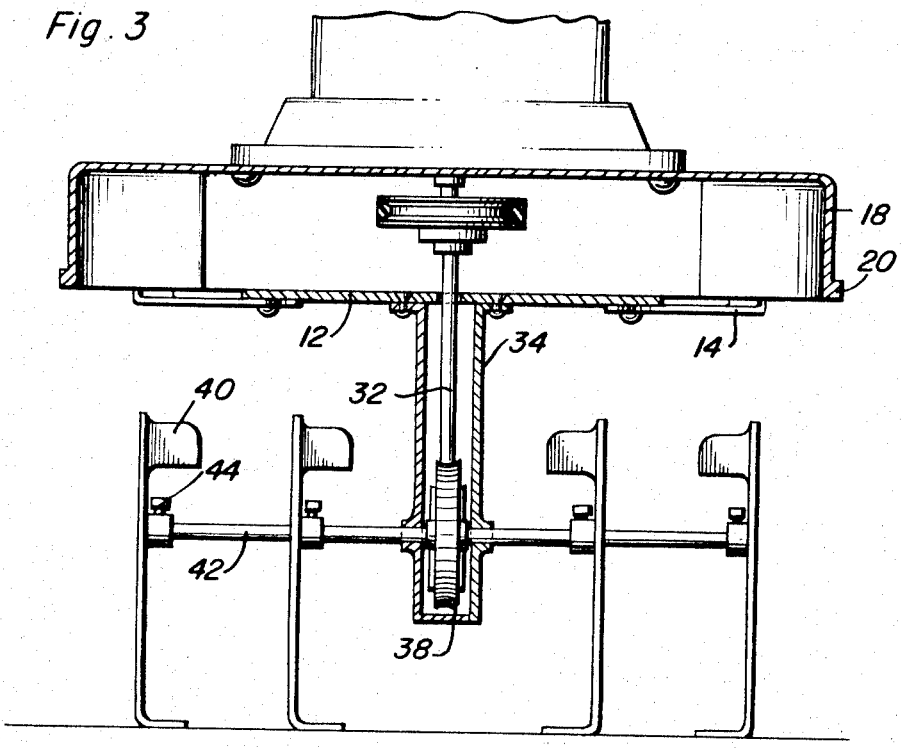
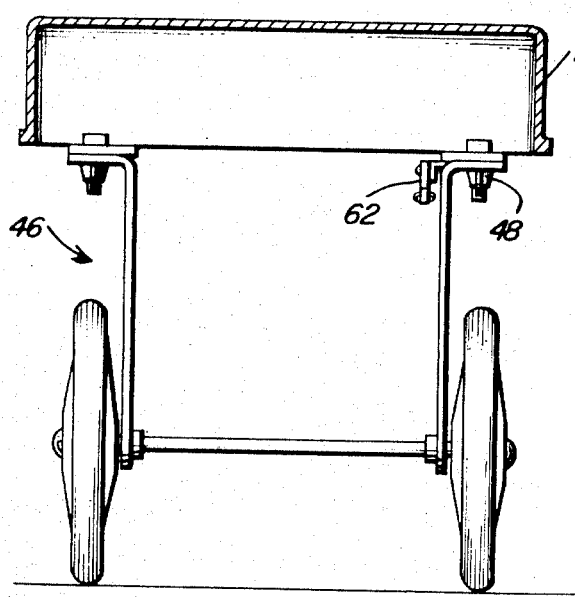
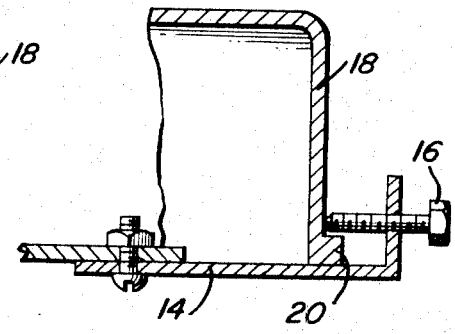

TILLER ATTACHMENT FOR POWER MOWERS

The present invention is generally related to soil tillers and, more particularly, to a tiller attachment for rotary power mowers and similar equipment.

In recent years rotary power mowers have become quite popular and, more recently, other power driven equipment such as soil tillers, aerators and fertilizers have become common with landscaping and gardening enthusiasts. As such, many homeowners have become burdened with several pieces of power driven equipment which take up considerable storage space and which are relatively expensive to purchase and maintain. This is particularly true of conventional power driven soil tillers. Therefore, it is desirable to provide a soil tiller attachment which may utilize the motor associated with a rotary power mower, or similar power equipment.

It is an object of the present invention to provide a novel tiller attachment for use with conventional rotary power mowers or similar portable power equipment with a vertical output shaft directed toward the ground, such attachment including means for conveniently and quickly mounting to the mower frame thereby providing an inexpensive power driven soil tiller.

Another object of the present invention is to provide a unique tiller attachment of relatively simple construction and which may be easily attached to an existing rotary power mower with a minimum amount of labor and expense, thereby utilizing the power mower motor to drive the tiller tines.

It is a further object of the present invention to provide a versatile tiller attachment for mounting to power mowers and which includes means for selectively controlling the drive of the tiller tines during operation thereof by the power mower motor.

These together with other objects and advantages which will become subsequently apparent reside in the details of construction and operation as more fully hereinafter constructed and operation as more fully hereinafter described and claimed, reference being had to the accompanying drawings forming a part hereof, wherein like numerals refer to like parts throughout and in which:

FIG. 3 is a sectional view taken along section 3—3 of FIG. 1.

FIG. 4 is a sectional view taken along section 4—4 of FIG. 1.

FIG. 5 is a sectional view taken along section 5—5 of FIG. 1.

Figure 1:
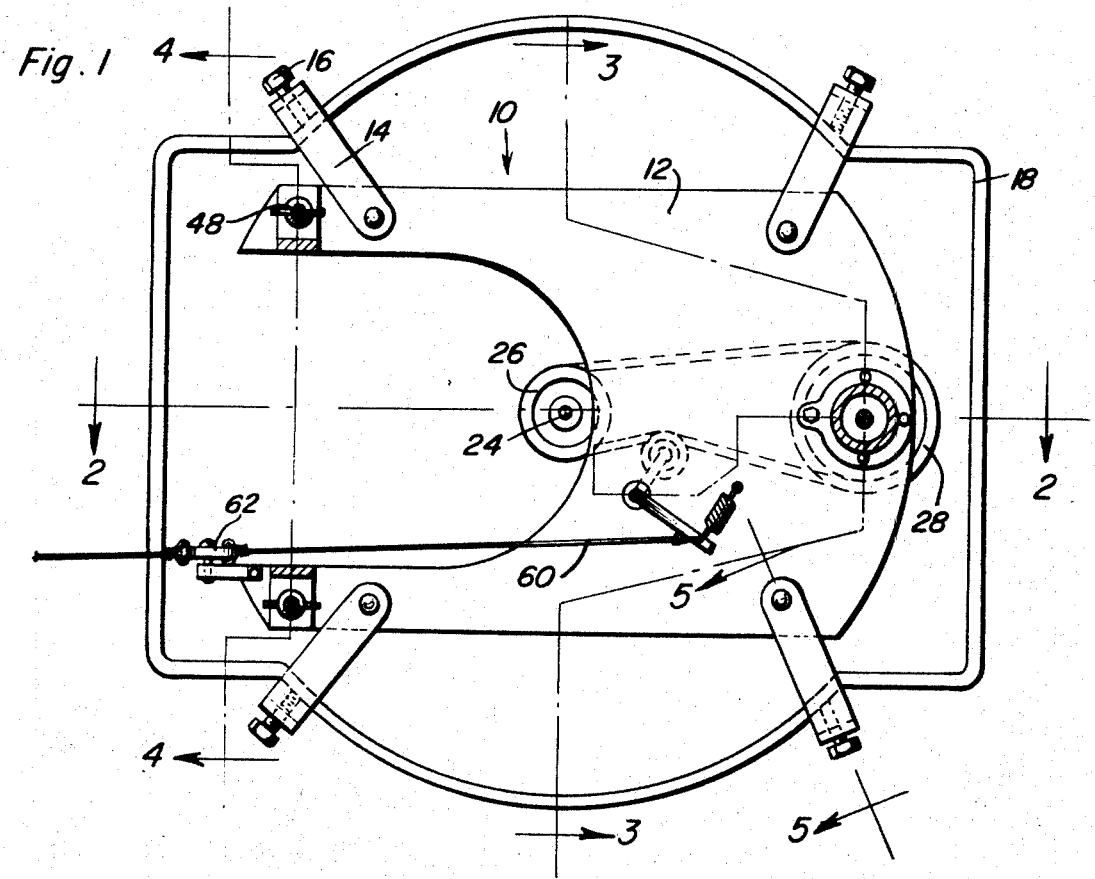
FIG. 1 is a bottom view of the tiller attachment of the present invention taken along section 1—1 of FIG. 2.
Figure 2:
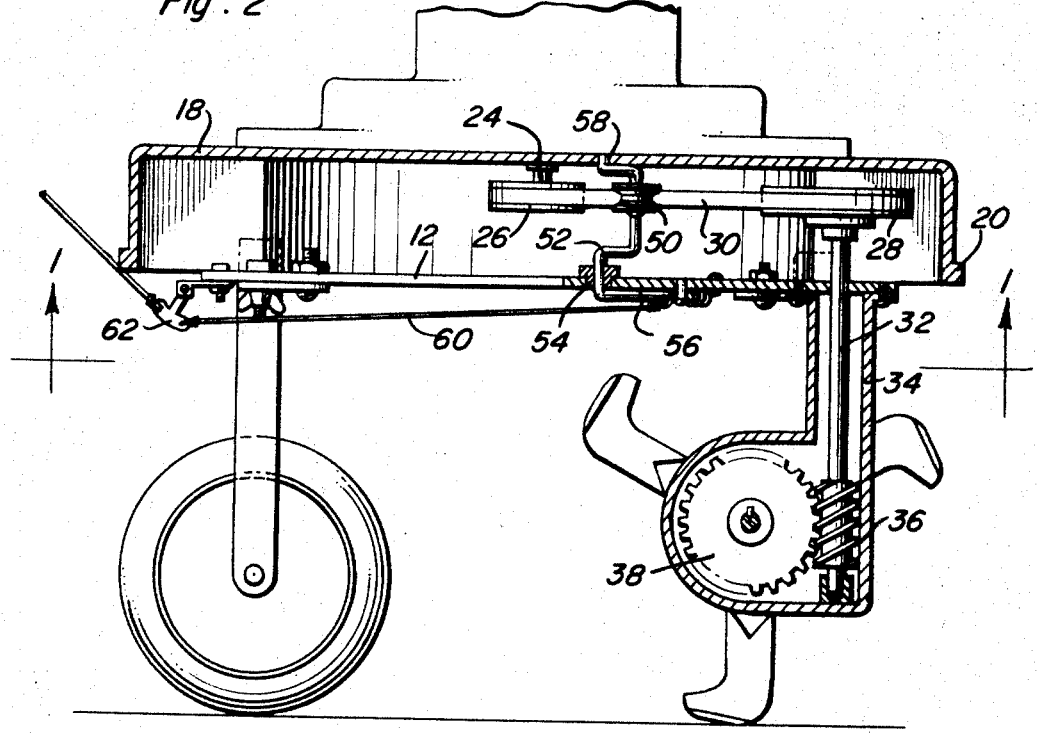
FIG. 2 is a sectional view of the tiller attachment of the present invention mounted to a typical power mower housing.

Referring now, more particularly, to the drawings, the tiller attachment of the present invention is generally indicated by the numeral 10 and is provided with a framework including a relatively rigid mounting plate 12 of steel, or similar materials with a plurality of mounting arms 14 pivotally connected thereto. The outer ends of each mounting arm may be provided with a threaded bolt 16, or similar fastener which is adapted to engage a power mower housing, such as that indicated at 18. The housing is illustrated as being provided with a peripheral flange or widened portion 20 which coacts with each fastening bolt 16, as illustrated in FIG. 5. However, other fastening means may be utilized for connection to the power mower housing, as required. It will be appreciated that the pivotal connection of each fastening arm to the mounting plate permits accommodation of many power mower housings of different sizes and configurations.

It should be noted that while the tiller attachment of the present invention is illustrated as being connected to a conventional rotary power mower construction, it is not intended that the attachment be limited to use with rotary power mowers since such may be connected to other types of power driven equipment which are provided with rotary output shafts extending in a downward direction. Such an output shaft is indicated at 24 and is normally provided with means for carrying a rotary cutting blade, not illustrated. When utilizing a conventional rotary power mower construction, a drive sheave such as that indicated at 26 is substituted for the rotary cutting blade, such being held in place by way of a key or set screw. The tiller attachment is provided with a second sheave 28 with a drive belt 30, of a conventional type connecting it with sheave 26. Sheave 28 is affixed to the upper end of a drive shaft 32 which is rotatably supported by the tiller attachment framework and extends downwardly into an enclosure 34 surrounding a worm drive including a worm gear 36 and pinion 38.

A plurality of soil tiller tines 40 are mounted to a tiller shaft 42 by way of bolts 44, or similar fastening means. The tiller shaft is keyed to pinion 38, such that it is advanced therewith when drivingly connected to the power mower motor. Each tiller tine is of a conventional construction, but may include more ground engaging members than that illustrated in the drawings.

Drive shaft 32 and the associated housing 34 are mounted near one and of mounting plate 12 such that the tiller tines provide support for the mower housing and motor along a first general edge area thereof. In order to provide proper balance and control of the tiller during operation, a wheel assembly 46 may be provided which is fastened to the opposite end of mounting plate 12 by way of wing nuts 48 or similar fastening means and which extends in a downward direction for engagement with the ground surfaces.

Control of the belt tension 30 may be provided by way of an idler pulley 50 which is rotatably carried by an eccentric rod 52 pivotally connected to mounting plate 12 by way of a bushing 54, or similar means. The eccentric rod is provided with an integral lever arm 56 positioned along the underside of mounting plate 12. In order to provide a secure mounting for the eccentric rod, a hole 58 may be provided in the power mower housing in substantial alignment with bushing 54 when the tiller attachment is in proper position. If desired, the necessity of a mounting hole in the mower housing may be eliminated by providing a larger bushing to assure rigidity to the eccentric rod during the operation thereof. It will be appreciated that manipulation of lever arm 56 associated with the eccentric rod is effective to change the position of idler pulley 50 relative to sheaves 26 and 28. This provides a convenient means of adjusting the belt tension between the sheaves. Preferably, adjustment of the lever arm is achieved by way of an elongated control cable 60 which extends beneath the mounting plate to the mower handle assembly, not illustrated, by way of a small lever, such as that at 62, pulley or similar fitting. As such, by manipulating a lever on the handle assembly it is possible to adjust the belt tension during operation of the mower with tiller attachment. The idler pulley may be effective to provide a clutch action to the belt, depending upon the amount of slack provided. By selecting the proper drive belt size, it is possible to conveniently control movement of the tiller tines while the mower motor remains running. This permits the user of the tiller attachment to stop forward motion thereof without stopping the mower motor.

From the foregoing description it will be appreciated that the tiller attachment of the present invention provides an inexpensive and convenient means of tilling soil without the need of an expensive permanently mounted motor construction. The tiller attachment is adapted to accommodate most existing rotary mower constructions with a minimum number of modifications. Furthermore, once the initial installation and modifications have been made to the power mower, it is apparent that the attachment may be readily disconnected and the mower cutting blade reinstalled, as required. The tiller attachment is relatively simple in construction and utilizes a minimum number of moving parts. Furthermore the compactness of the attachment permits easy storage in a minimum amount of space.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a piece of power equipment with a downwardly directed output shaft and adjacent housing, a tiller attachment, said attachment comprising: a relatively rigid support framework including a stationary plate underlying said housing, means mounted on said plate for releasably fastening said framework to said housing, a drive shaft rotatably supported by said framework and normally extending in a downward direction toward the ground, a plurality of tiller tines drivingly connected to one end of said drive shaft for working engagement with the ground, a first sheave affixed to the opposite end of said drive shaft, a second sheave affixed to said output shaft a belt connecting said first and second sheaves, an eccentric shaft pivotally supported by said plate for selective movement about a first axis, an idler pulley mounted to said eccentric shaft and rotatable about a second axis spaced from said first axis to adjust the belt tension by snug engagement of said idler pulley with said belt, and control means operatively connected to said eccentric shaft and extending to the power equipment for selective rotation of said eccentric shaft for adjustment of the belt tension during operation.

2. The structure set forth in claim 1 wherein said control means includes an elongated flexible member adapted to extend between the idler pulley mounting and the power mower handle assembly.

3. The structure set forth in claim 2 wherein said tiller tines are connected to said drive shaft by a worm gear drive.

4. The structure set forth in claim 3 wherein said attachment includes a pair of wheels connected to said framework to maintain said plate and mower in a substantially horizontal position above the ground.

5. The structure set forth in claim 4 wherein said fastening means includes a plurality of arms pivotally mounted to said plate and extending horizontally outward therefrom and in retentive engagement with said power equipment housing.

6. The structure set forth in claim 1 wherein said housing includes a support hole, a portion of said eccentric shaft being disposed in said support hole to support said pulley and eccentric shaft between said plate and said housing.

* * * * *